United States Patent
Greenaway et al

[15] 3,658,403
[45] Apr. 25, 1972

[54] HIGH FIDELITY READOUT OF A HOLOGRAM PERFORMING THE FUNCTION OF A COMPLEX WAVE MODIFYING STRUCTURE

[72] Inventors: David L. Greenaway, Basserdof; John P. Russell, Thalwil, both of Switzerland

[73] Assignee: RCA Corporation
[22] Filed: Mar. 27, 1969
[21] Appl. No.: 810,954

[30] Foreign Application Priority Data

June 20, 1968 Great Britain......................29,580/68
June 20, 1968 Great Britain......................29,581/68

[52] U.S. Cl.............................350/3.5, 350/162 SF, 96/36.2
[51] Int. Cl. .....................................................G02b 27/22
[58] Field of Search.............................350/3.5, 162; 96/36.2

[56] References Cited

UNITED STATES PATENTS

| | | | |
|---|---|---|---|
| 3,405,614 | 10/1968 | Lin et al.............................. | 350/3.5 X |
| 3,490,827 | 1/1970 | Van Ligten et al. .................... | 350/3.5 |
| 3,526,505 | 9/1970 | Kroemer............................... | 96/36.2 |
| 3,506,327 | 4/1970 | Leith et al............................ | 350/3.5 |
| 3,582,177 | 6/1971 | Kiemle................................ | 350/3.5 |

OTHER PUBLICATIONS

Sincerbox, IBM Tech. Disc. Bulletin, Vol. 10, No. 3, p.267 (8/1967)
Buzzard, High Speed Photography, Proceedings of the 8th International Congress, Stockholm, pp. 335–340 (6/1968)

Primary Examiner—David Schonberg
Assistant Examiner—Robert L. Sherman
Attorney—Edward J. Norton

[57] ABSTRACT

The method of reading out the type of hologram which results from the simultaneous recording on a recording medium surface of first and second components of coherent wave energy, wherein the first component consists of a beam traveling substantially in a given direction with respect to the surface and wherein the second component has been operated on by a particular complex wave modifying structure working on the principles of optics, such as an array of lenses lying in a plane parallel to the medium surface. Readout is accomplished with a readout beam of incident wave energy traveling substantially in the direction with respect to the medium surface which is opposite to the aforesaid given direction. Object information may be also recorded on the hologram by spatially modulating the first component with the object information, or object information may be obtained during readout by spatially modulating the readout beam with object information. In either case, high fidelity reconstruction is obtained, which depends both on the object information and the particular complex wave modifying structure utilized in making the hologram. In the case where the structure is a lens array, multi-imaging of the object information is obtained. Also, in the case where object information is obtained by spatially modulating a readout beam which has been diffused by a diffuser, speckle noise normally present in the reconstructed image may be eliminated by destroying the coherence of the wave energy for example by rotating the diffuser during readout.

3 Claims, 8 Drawing Figures

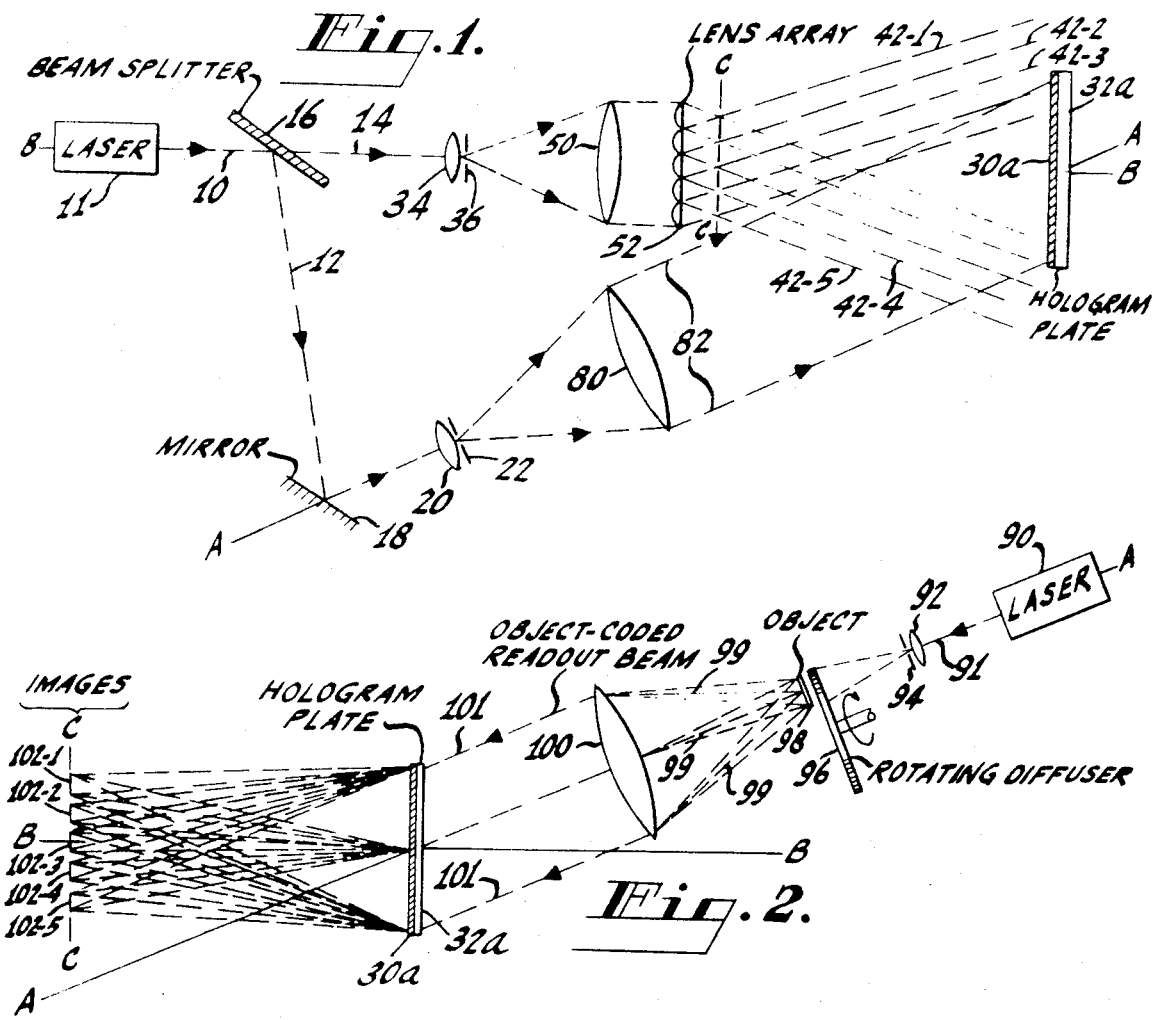
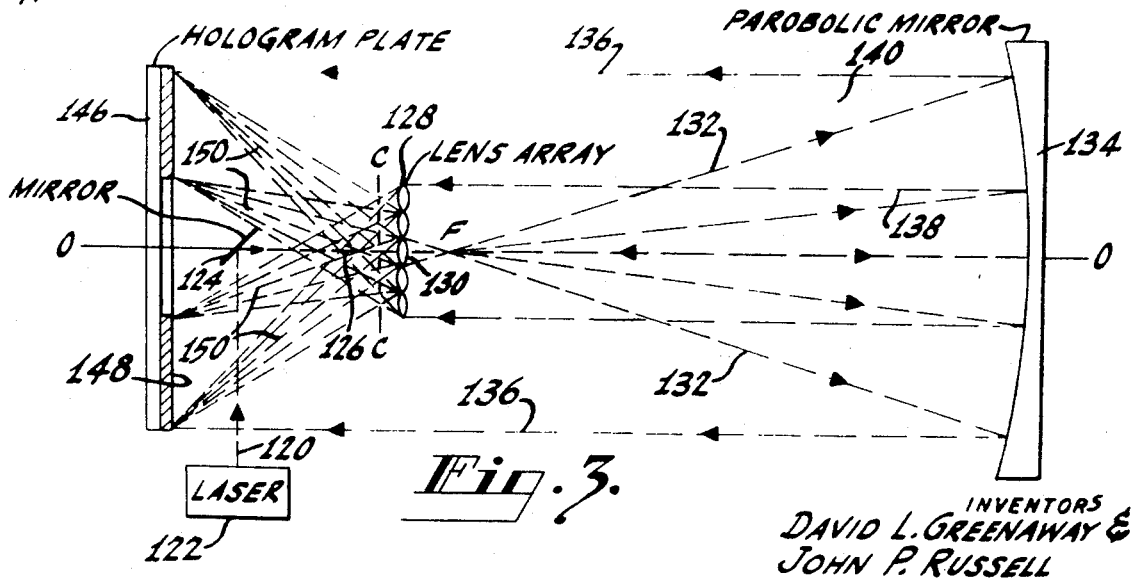

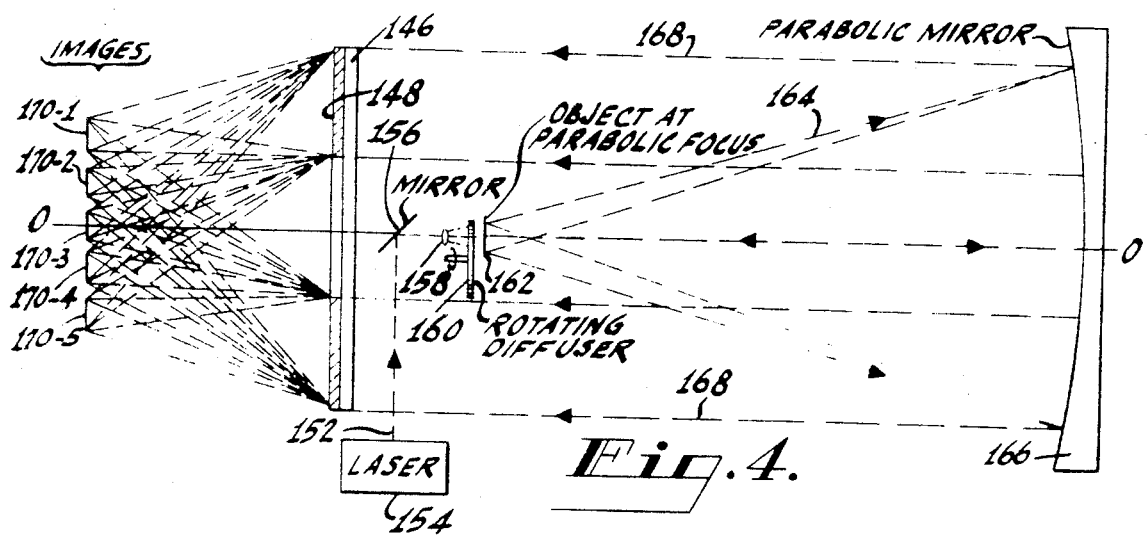
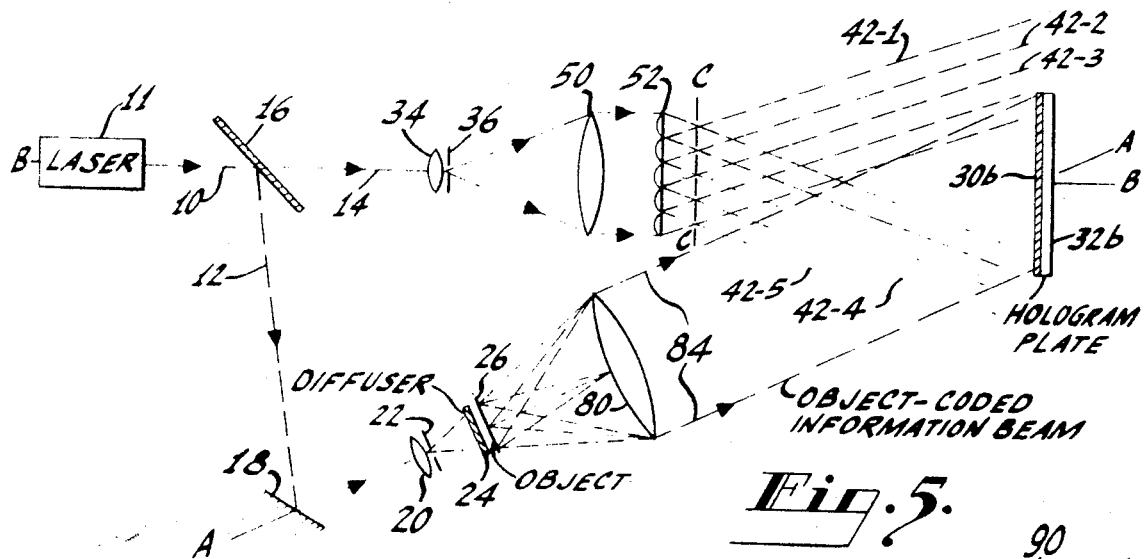
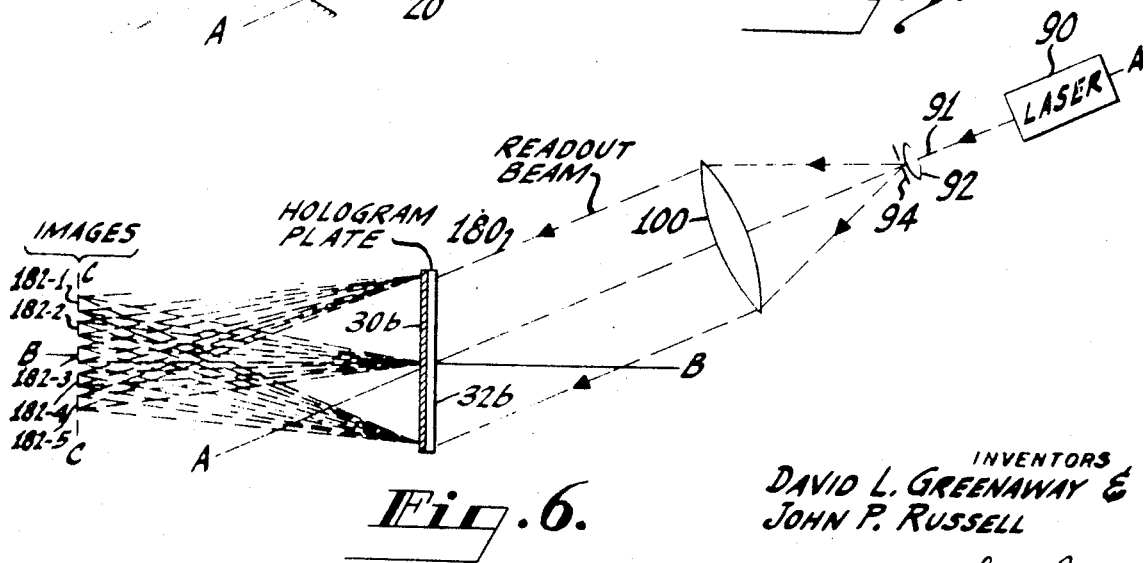

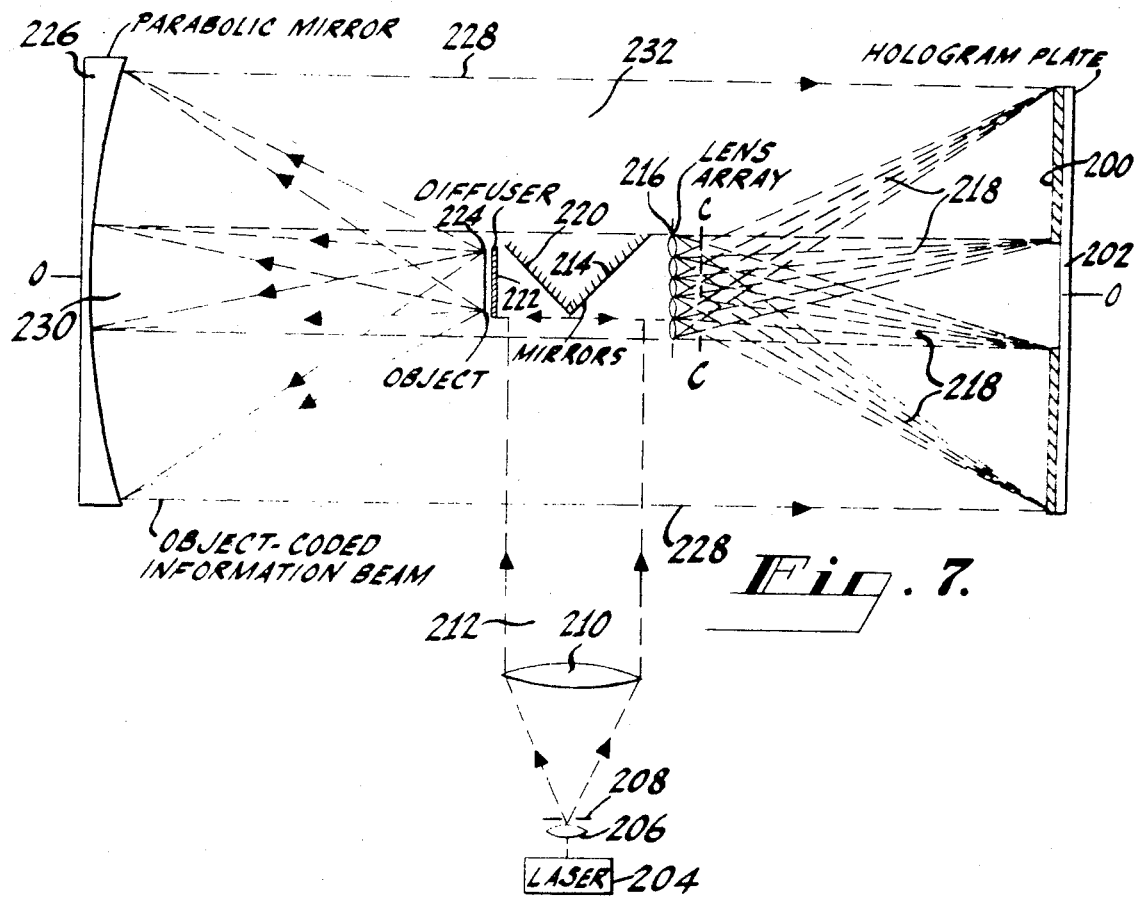
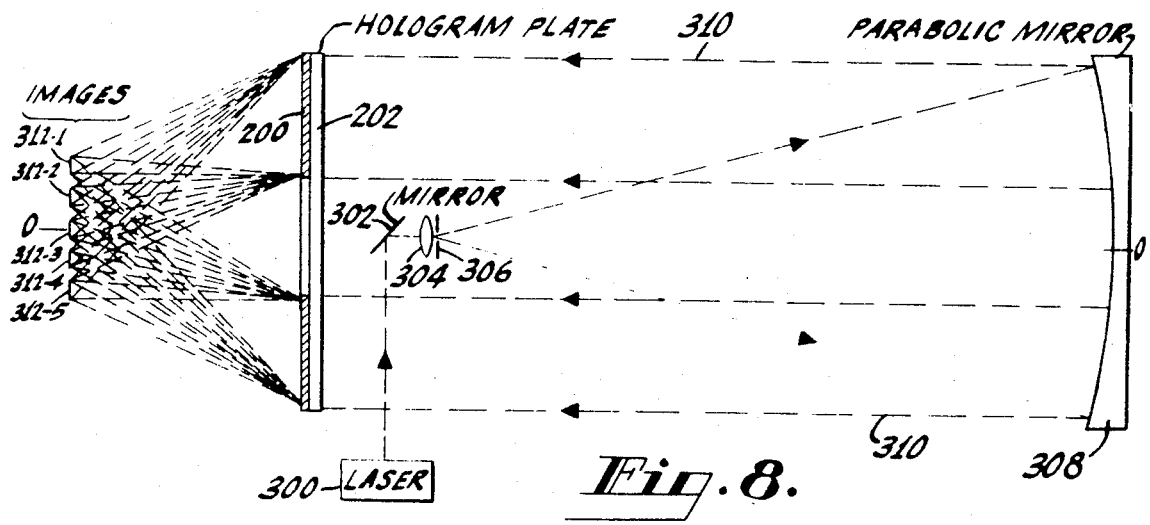

HIGH FIDELITY READOUT OF A HOLOGRAM PERFORMING THE FUNCTION OF A COMPLEX WAVE MODIFYING STRUCTURE

This invention relates to holography and, more particularly, to the high fidelity readout of a hologram performing the function of a complex wave modifying structure working on the principles of optics. The invention, while not limited thereto, is particularly suitable to the case where the hologram results in the multi-imaging of object information. This object information or any part of it may be either stored in the hologram at the time the hologram is recorded or it may be obtained from the readout beam at the time the hologram is being read out.

The term "complex wave modifying structure working on the principles of optics," as used herein, means a coordinated arrangement of elements working on the principles of optics, such as gratings, lenses, mirrors and/or prisms, rather than a single lens or mirror, which results in wave energy which has been operated on by such structure having a wavefront which is tailored to a predetermined desired configuration. The principles of optics are concerned with the laws of reflection, refraction and diffraction. Although optics usually relate only to light, the principles of optics apply to other types of wave energy. For instance, there are microwave reflectors and microwave lenses, as well as acoustic reflectors and acoustic lenses. Therefore, the terms "wave" and "wave energy," as used herein, are not confined to light energy, but include all types of wave energy for which the principles of optics apply.

Holograms may be recorded as a three-dimensional volume interference pattern or, at least nominally, a two-dimensional surface interference pattern, in which the recorded intensity variations which form the hologram may be either density variations (blackening of a photographic film, for instance) or phase variations (changes in refractive index or optical thickness of a transparent hologram record, for instance). So-called "surface" holograms in real photographic emulsions are in fact complicated combinations of both surface and volume effects, and both density and phase variations.

This invention is intended to cover all types of holograms, both surface and volume and both density and phase.

Usually a hologram consists of an interference pattern recorded on or in the surface of a recording medium between a directly applied incident single reference beam component of coherent wave energy and an information component obtained from an object illuminated with the coherent wave energy. Readout of the real image of such a hologram may be accomplished by a readout beam which is the conjugate of the single reference beam utilized in making the hologram. This results in a single real image of the object being reconstructed.

In pending application, Ser. No. 810,983 entitled "Complex Wave Modifying Structure Holographic System," filed by David L. Greenaway on even date with this application, there is disclosed the simultaneous use of a plurality of similar, spaced reference beams, rather than a single reference beam, in recording a special type of hologram. This special type of hologram, when read out by a single readout beam simultaneously produces a separate image of any recorded object information corresponding to each and every one of the plurality of reference beams utilized in recording the hologram. Preferably, in accordance with the teachings of this co-pending application, the single readout beam should be the conjugate of the most centrally located of the plurality of reference beams utilized in recording the hologram. In this case, a centrally located image will have the highest resolution and the least distortion of all the reproduced images. However, although the fidelity of reproduction of the non-centrally located images is somewhat lower than the centrally located image, the resolution and clarity obtainable are more than sufficient for most purposes.

However, in all cases it would be desirable, and in some cases essential, to reproduce the non-centrally located images with the same high degree of fidelity and resolution as the centrally located image. For instance, this is true in the process of manufacturing integrated circuits, where a hologram can be used to print simultaneously and directly onto the semiconductor wafer or process mask a large number of separate extremely small images of the circuit to be produced. High resolution multi-imaging holograms are also of particular use in computer work for character recognition.

The present invention is concerned with an improved method of reading out the type of hologram which results from the simultaneous recording on a recording medium surface of first and second components of coherent energy, wherein the first component consists of a beam traveling substantially in a given direction with respect to the surface and wherein the second component is traveling substantially in other than the given direction and has been operated on by a particular complex wave modifying structure working on the principles of optics for producing a predetermined specific effect on the wave energy impinging thereon. The particular method of reading out this type of hologram is to illuminate the hologram with a readout beam of incident wave energy traveling substantially in a direction with respect to the hologram medium surface which is opposite to the aforesaid given direction. Object information may also be recorded on the hologram by spatially modulating the aforesaid first component with the object information. In this case, the hologram contains not only information about the object, but instructions to perform an active optic operation during readout.

Instead of storing object information in the hologram, as is described above and which is conventional, the aforesaid first component of wave energy may be unmodulated. In this case, object information is not inserted until readout by spatially modulating the readout beam. Also, part of the object information may be stored in the hologram by spatially modulating the aforesaid first component, while the remainder of the object information is obtained during readout by spatially modulating the readout beam.

In any case, high fidelity reconstruction is obtained which depends both on the object information and the particular complex wave modifying structure utilized in making the hologram. In the case where the structure is a lens array, multi-imaging of the object information is obtained. Also, in the case where object information is obtained by spatially modulating a readout beam which has been diffused by a diffuser, speckle noise, normally present in the reconstructed image, may be eliminated by destroying the coherence of the object illuminating beam for example by rotating the diffuser during readout.

It is therefore an object of the present invention to provide an improved holographic technique which is especially suitable for, but not limited to, high fidelity, high resolution multi-imaging.

This and other objects, features and advantages of the present invention will become more apparent from the following detailed description taken together with the accompanying drawings, in which:

FIG. 1 illustrates a first system for recording a hologram in accordance with the principles of the present invention;

FIG. 2 illustrates a system for reading out the hologram of FIG. 1 in accordance with the principles of the present invention;

FIG. 3 illustrates a second embodiment of a system for recording a hologram in accordance with the principles of the present invention;

FIG. 4 illustrates a system for reading the hologram of FIG. 3 in accordance with the principles of the present invention;

FIG. 5 illustrates a third embodiment of the system for recording a hologram in accordance with the principles of the present invention;

FIG. 6 illustrates a system for reading out the hologram of FIG. 5 in accordance with the principles of the present invention;

FIG. 7 shows a third embodiment of a system for recording a hologram in accordance with the principles of the present invention; and FIG. 8 illustrates a system for reading out the hologram of FIG. 7 in accordance with the principles of the present invention.

Referring now to FIG. 1, a coherent beam of wave energy 10 from laser 11 is split into first portion beam 12 and second portion beam 14 by beam splitter 16, which may be a partially reflecting mirror. First portion beam 12 of coherent energy, after reflection from mirror 18 and being enlarged by means including lens 20 and plate 22 having a single pinhole therethrough, is collimated by lens 80 into parallel first component of wave energy 82. At least a part of first component 82, which travels in a direction parallel to line A—A, is incident on the recording medium surface 30a of hologram plate 32a.

Second beam portion 14, after being enlarged by means including lens 34 and plate 36 having a single pinhole therethrough and being collimated by lens 50, is incident on lens array 52. Lens array 52 includes a plurality of similar convex lenses lying in a plane, all of which lenses have their foci lying in a given plane C—C. Given plane C—C is oriented substantially parallel to the plane of recording medium surface 30a of hologram plate 32a and is located a given distance therefrom. For illustrative purposes, lens array 52 is shown as consisting of only five lenses arranged vertically. However, in practice, lens array 52 would consist of a much larger number of lenses arranged two dimensionally, i.e., both vertically and in a direction into the paper. Lens array 52 could have any desired geometric configuration.

The wave energy emerging from the respective lenses of lens array 52 gives rise to a second component of wave energy consisting of respective spaced divergent beams 42-1 ... 42-5 each of which emerges from a different point source in plane C—C which corresponds to the particular lens of lens array 52 from which that one of divergent beams 42-1 ... 42-5 is derived. At least part of each of divergent beams 42-1 ... 42-5, which together form the second component of wave energy, is incident on recording medium surface 30a of hologram plate 32a. The general direction of this second component of wave energy with respect to recording medium surface 30a is along line B—B.

The hologram recorded on or in recording medium 30a of hologram plate 32a consists of the interference pattern between the first component consisting of parallel beam 82 and the second component consisting of the plurality of divergent beams 42-1 ... 42-5 which are incident on recording medium surface 30a of hologram plate 32a. The hologram recorded by the structure shown in FIG. 1 is distinguished from conventional holograms by the fact that neither the first nor the second component of wave energy contains any object information and no object information is stored in the recorded hologram. Instead, the recorded hologram stores information pertaining to a particular complex wave modifying structure, such as lens array 52, working on the principles of optics for producing a predetermined specific effect on wave energy impinging thereon, such as the effect of producing the spaced divergent beams 42-1 ... 42-5.

Parallel beam 82 forming the first component of wave energy has a wavefront with zero curvature. However, this is not essential to the present invention. The first component of wave energy may be a beam having a wavefront with any given curvature, either positive or negative. Thus, the first component beam may be a converging beam or a diverging beam, rather than a parallel beam as shown in FIG. 1. However, in all cases, the value of the curvature of the wavefront of the first component beam incident on the recording medium surface 30a of hologram plate 32a, as well as the general direction of the beam with respect to hologram plate 32a is known a priori.

Referring now to FIG. 2, there is shown structure for reading out a hologram recorded on or in the recording medium 30a of hologram plate 32a by means of the structure shown in FIG. 1. The structure shown in FIG. 2 comprises laser 90, which emits beam 91. Beam 91, after being enlarged by beam enlarging means including lens 92 and plate 94 having a single pinhole therein, is passed through diffuser 96, which is preferably rotated by means not shown. The diffused wave energy emerging from diffuser 96 is passed through object 98, which may be a transparency, to thereby spatially modulate the wave energy emerging from object 98, i.e., the diffused wave energy emerging from the object 98 varies in intensity and phase from point to point over its cross section in accordance with object information. Object 98 is located in the focal plane of convex lens 100. Therefore, the diffused intensity-modulated rays 99 of wave energy emerging from object 98 which pass through convex lens 100 emerge from lens 100 as parallel, object-coded readout beam 101. Readout beam 101, after passing through the back of hologram plate 32a, is incident on the hologram recorded on the surface of recording medium 30a.

What has not so far been discussed is the direction of travel of object-coded readout beam 101 with respect to recording medium surface 30a, on which is recorded the hologram to be read out. This direction with respect to the surface of recording medium 30a, is as shown, parallel to the line A—A, i.e., it is, with respect to the recording medium surface 30a, parallel to the given direction of the incident first component of wave energy utilized in recording the hologram. However, the direction of object-coded readout beam 101 with respect to recording medium surface 30a is not the same as the direction of this first component of wave energy, but is opposite thereto, i.e., object-coded readout beam 101 is incident on the back of surface 30a, while the first component utilized in recording the hologram was incident on the front of recording medium surface 30a.

If the wavelength of the wave energy from laser 90 of FIG. 2, utilized for readout, is the same as the wavelength of the wave energy from laser 11 of FIG. 1, utilized for recording, which for the present is assumed to be the case, a separate, distinct real image 102-1 ... 102-5 of the object information provided by object 98 corresponding to each and every one of the lenses of lens array 52 of FIG. 1 is produced. Each of images 102-1 ... 102-5 lies in plane C—C, i.e., in a plane parallel to hologram plate 32a which is located at the same distance from recording medium surface 30a as was the point sources giving rise to divergent beams 42-1 ... 42-5 of FIG. 1 utilized in recording the hologram.

Not only does the structure in FIG. 2 result in the multi-imaging of object information from object 98 with the number and configuration of the images being determined by the information recorded in the hologram, but each and every one of images 102-1 ... 102-5 is reproduced with substantially the same very high resolution and fidelity.

As is known, the use of diffused light in connection with holography provides a redundancy in information which is highly desirable. However, one undesirable feature of using diffused light is that reproduced images exhibit "speckle" noise, which is similar to graininess in photographic reproductions. If the diffuser is rotated as shown in FIG. 2 or otherwise moved, the desired redundancy provided by a diffused readout beam will not be diminished, but the speckle noise normally produced by a stationery diffuser will be averaged out by the moving diffuser. Therefore, the clarity with which images 102-1 ... 102-5 will be reproduced is greatly enhanced by rotating diffuser 96, as shown in FIG. 2.

As was discussed above in connection with FIG. 1, first component beam 82 need not be parallel and have a wavefront of zero curvature. It may be either convergent or divergent, so long as the curvature of the wavefront incident on recording medium surface 30a is known. In this latter case, object-coded readout beam 101, rather than being parallel and having a zero curvature wavefront, as shown in FIG. 2, should preferably have a wavefront incident on the back of recording medium surface 30a which is the conjugate of the curvature of the wavefront of the first component utilized in recording the hologram, i.e., if the first component was a divergent beam having a wavefront with certain absolute value of curvature incident on the recording medium surface, the readout beam should be a convergent beam having a wavefront with the same given absolute value of curvature incident on the back of recording medium surface 30a, and vice versa. If this is true, and the general direction of travel of the readout beam remains opposite to the direction of travel of the first component utilized in recording the hologram, reproduced images 102-1 . . . 102-5 of object 98 will lie as shown in FIG. 2 substantially in Plane C—C. If this equality between absolute value of wavefront curvatures of first component 82 and conjugate readout beam 101 is not maintained, then the plurality of images formed by the hologram will be either magnified or demagnified and will no longer lie in the plane C—C. Images formed under such conditions will exhibit aberrations, and these aberrations will increase with the amount of magnification or demagnification. When the equality between absolute values of wavefront curvatures of first component 82 and conjugate readout beam 101 is maintained, then the size of each of the images reconstructed by the hologram bears a fixed relationship to the size of the object. This relationship is determined by the ratio of the focal length of the hologram (this focal length is defined as the distance between plane C—C and the hologram recording medium 30a) to the focal length of the collimating lens 80 used to produce plane wave 82. When no collecting lens 80 is used the magnification or demagnification is determined by the ratio of the said focal length of the hologram to the distance between the hologram recording medium and the object when correctly positioned for readout.

The magnified or demagnified images produced in this way are high resolution images. To change the magnification or demagnification and maintain high resolution a different hologram or a different collimating lens must be used. However magnification or demagnification of images 102-1 . . . 102-5, with respect to that of object 98 may also be obtained if desired by changing the wavelength of the wave energy from laser 90 of FIG. 2 with respect to that of laser 11 of FIG. 1.

The use of lens array 52 to illustrate a complex wave modifying structure is merely exemplary. First of all, other means, such as a pinhole plate or a structure composed of mirrors could be utilized to provide a plurality of separate point sources of wave energy lying in a given plane from which arise spaced divergent beams of wave energy forming the second component utilized to record the hologram. Second of all, the complex wave modifying structure could be such means as a microscope, telescope, grating or a plurality of lenses to provide an optic system having negligible unwanted aberrations, etc. Regardless of the specific type of complex wave modifying structure utilized to provide the second incident component which interferes with the first incident component at the recording medium surface of the hologram plate to produce a particular hologram, the hologram so produced has very special properties when read out by a readout beam which is traveling in a direction with respect to the recording medium surface of the hologram plate which is opposite to that of the aforesaid first component. One of the special properties is the fact that the recorded hologram is capable of performing either the same or a complimentary function on incident wave energy as the particular complex wave modifying structure which was utilized in making the hologram. This makes it possible to record holograms which can be substituted for actual complex wave modifying structures working on the principles of optics for performing any one of a number of predetermined active optical functions, whether that function be multi-imaging, acting as a microscope, acting as a telescope, acting as a very expensive lens system that exhibits negligible aberration, etc.

Referring now to FIGS. 3 and 4 which show structure alternative to that of FIGS. 1 and 2 for respectively recording and reading out a hologram formed by the interference pattern between an incident first component of coherent wave energy which has not been spatially modulated by object information and an incident second component of coherent wave energy which has been operated on by a complex wave modifying structure, such as a lens array. The embodiments shown in FIGS. 3 and 4 have the advantage of providing circular symmetry for both the first and second components utilized in recording the hologram, the readout beam utilized in reading out the hologram, and many of the components utilized in both recording and reading out the hologram.

In particular, a beam of coherent wave energy 120 from laser 122 is reflected from mirror 124 to derive wave energy beam 126 traveling along axis 0—0, as shown. Lens array 128 consists of a plurality of similar convex lenses symmetrically disposed with respect to axis 0—0, and lying in a plane perpendicular to axis 0—0, with their respective foci lying in a given plane C—C perpendicular to axis 0—0. Lens array 128 includes centrally located lens 130 on axis 0—0.

For illustrative purposes lens array 128 is shown as including only five lenses arranged vertically. In practice, lens array 128 would normally include a much larger number of lenses arranged in any configuration in a plane perpendicular to axis 0—0.

As shown, beam 126 is incident on centrally located lens 130 of lens array 128 which focuses the wave energy at point F. This results in a divergent beam of wave energy 132, having its origin at point F, being derived from the wave energy emerging from lens 130. Divergent beam 132 impinges upon the reflective surface of parabolic mirror 134, which is symmetrically situated with respect to axis 0—0 and has its focus coincident with point F. Further, the size of parabolic mirror 134 and, more particularly, the area of the surface of parabolic mirror 134 which is illuminated by divergent beam 132 has significantly larger dimensions than the dimensions of lens array 128, as shown.

Since point F is both the origin of divergent beam 132 and the focus of parabolic mirror 134, parabolic mirror 134 in response to incident beam 132 will reflect parallel beam 136 which includes an interior portion 138, defined by the area occupied by lens array 128, and an annular portion 140 surrounding interior portion 138. Situated, as shown, on the other side of lens array 128 from parabolic mirror 134 is hologram plate 146 including recording medium surface 148, which lies in a plane parallel to that of lens array 128. Annular portion 140 of parallel beam 136 misses lens array 128 and is incident on recording medium surface 148 of hologram plate 146 solely on an annular region thereof defined by the cross section of annular portion 140.

All of interior portion 138 of parallel beam 136 is incident on lens array 128. Each of the lenses of lens array 128 has its focus lying at a separate point in given plane C—C which individually corresponds to that lens of lens array 128. Given plane C—C is perpendicular to axis 0—0 and parallel to hologram plate 146. Therefore, each of the individual foci lying in plane C—C acts as a separate spaced point source of divergent beams of wave energy 150 all of which are incident on recording medium surface 148 of hologram plate 146. However, interference between incident beams of wave energy 150 and incident annular portion 140 takes place only over the aforesaid annular region of recording medium surface 148 of hologram plate 146, since the incident wave energy of annular portion 140 of parallel beam 136 is confined to this annular region of recording medium surface 148 of hologram plate 146. This results in an annular hologram which is circularly symmetrical about axis 0—0 being recorded on surface 148 of hologram plate 146.

FIG. 4 shows the structure employed for reading out the annular hologram recorded by means of the structure shown in FIG. 3. Wave energy 152 from laser 154, after reflection from mirror 156 and enlargement by means of lens 158, is passed through rotating diffuser 160 and object 162, which may be a transparency. This results in spatially modulated beam of diffused wave energy 164, which is symmetrical with respect to axis 0—0, being produced. At least a portion of beam 164 is incident on parabolic mirror 166. Parabolic mirror 166 is symmetrically disposed with respect to axis 0—0 and is situated to have its focal plane in coincidence with object 162. This results in object-coded parallel readout beam 168, which travels in a direction parallel to axis 0—0, being produced. Readout beam 168 is incident on the back surface of hologram plate 146, which is symmetrically disposed with respect to axis 0—0 in a plane perpendicular to readout beam 168, as shown. The annular hologram recorded on or in recording medium 148 of hologram plate 146 diffracts the incident wave energy of object-coded readout beam 168 to produce a separate high fidelity, high resolution image 170-1 ... 170-5 of object 162 which corresponds in position to each and every individual one of the lenses forming lens array 128 of FIG. 3. Therefore, the configuration of images 170 with respect to each other will be similar to the configuration of the lenses of lens array 128 with respect to each other.

From the foregoing, it will be seen that the embodiments disclosed in FIGS. 1-4 are similar to each other to the extent that no object information is recorded in the hologram, and the readout beam is object-coded. However, as shown in FIG. 5-8, object information may be stored in the hologram in addition to optical information by spatially modulating the incident first component of wave energy utilized in recording a hologram, as well as by operating on the second component of wave energy with a wave modifying structure working on the principles of optics. In this case, the readout beam need not be spatially modulated.

More specifically, elements designated by reference numerals 10, 11, 12, 14, 16, 18, 20, 22, 34, 36, 42-1 ... 42-5, 50, 52, and 80, shown in FIG. 5 for recording a hologram on or in recording medium 30b of hologram plate 32b, are identical in structure and function to elements designated with the same reference numerals in FIG. 1 for recording a hologram on or in recording medium 30a of hologram plate 32a. The structure shown in FIG. 5 differs from that shown in FIG. 1 only in that first beam portion 12, after reflection by mirror 18 and enlargement by means of lens 20 and pinhole plate 22, is diffused by diffuser 24 and then spatially modulated by object 26, which may be a transparency, which is located in the focal plane of lens 80. This results in the incident first component of wave energy utilized in recording the hologram being object-coded information parallel beam 84, rather than unmodulated parallel beam 82 of FIG. 1. The general direction of travel of beam 84, the first component of wave energy employed in FIG. 5, with respect to hologram plate 32b is, of course, known a priori. The incident wavefront of the first component employed in FIG. 5 need not have a curvature of zero, as shown, so long as its curvature is also known a priori.

The structure employed for reading out the hologram recorded on or in recording medium 30b of hologram plate 32b of FIG. 5 is shown in FIG. 6. In FIG. 6, elements designated by the reference numerals 30b, 32b, 90, 91, 92, 94, and 100 are identical in structure and function to the elements of FIG. 2 designated by the same reference numerals.

In FIG. 6, readout beam 180 is a parallel beam of unmodulated wave energy which has a general direction of travel with respect to hologram plate 32b which is just opposite to that of first component beam 84 utilized in recording the hologram. In all other respects it is identical to readout beam 101 of FIG. 2. In response to recording medium 30b of hologram plate 32b being illuminated by readout beam 180, there is produced separate high fidelity, high resolution images of object 26 of FIG. 5, each of which corresponds in position to the respective position of a different one of the lenses of lens array 52.

Referring now to FIG. 7, there is shown apparatus for recording an annular hologram on or in recording medium 200 of hologram plate 202 which includes both object information and optical information. More specifically, wave energy from laser 204, after being expanded and collimated by lens 206, pinhole plate 208 and lens 210, forms a parallel beam of wave energy 212. The right-hand portion of beam 212, after reflection from mirror 214, travels to the right in a direction parallel to axis 0—0 and is operated on by lens array 216 to form a separate spaced point source at the focus of each of the lenses of lens array 216, all of which foci lie in a given plane C—C parallel to recording medium surface 200 of hologram plate 202. Divergent beams 218 of wave energy from each of these point sources are incident on recording surface medium 200 of hologram plate 202.

The left-hand portion of parallel beam 212, after reflection from mirror 220, forms a beam of wave energy symmetrically disposed about axis 0—0 traveling to the left through diffuser 222 and object 224, which spatially modulates the wave energy passing therethrough. Object 224 is located in the focal plane of parabolic mirror 226, so that the diffused spatially modulated wave energy which impinges upon parabolic mirror 226 is reflected to form object-coded information parallel beam 228, which is composed of an interior portion 230, defined by lens array 216, and an annular portion 232 surrounding this interior portion. Only annular portion 232 of parallel beam 228 is incident on recording medium surface 200 of hologram plate 202, where it interferes with incident wave energy from divergent beams 218 over only an annular region defined by the annular portion of parallel beam 228, thereby forming an annular hologram.

FIG. 8 shows the structure for reading out the hologram recorded by the structure of FIG. 7. More specifically, wave energy from laser 300, after reflection from mirror 302 and enlargement by lens 304 and pinhole plate 306, impinges on parabolic mirror 308, which is situated to have its focus coincident with the focus of lens 304. Therefore, the wave energy reflected from parabolic mirror 308, which constitutes readout beam 310, will be an unmodulated parallel beam of wave energy symmetrically disposed with respect to axis 0—0. Readout beam 310 is incident on the back surface of recording medium surface 200 of hologram plate 202. This results in the annular hologram recorded thereon being read out and producing a separate high fidelity, high resolution real image 312-1 ... 312-5 of object 224 corresponding in position to that of each and every one of the lenses of lens array 216.

Since object information may be obtained by spatially modulating the readout beam, as is the case in the embodiments shown in FIGS. 1-4, or by modulating the first component of wave energy utilized in recording the hologram, as is the case in FIGS. 5-8, both these means of obtaining object information may be used together. Thus, part of the object information may be stored in the hologram by spatially modulating the first component of wave energy utilized in recording the hologram, and then when this hologram is being read out the rest of the object information may be obtained by directly modulating the readout beam. In this case, so long as the readout beam of wave energy is traveling in a general direction with respect to the recorded hologram which is opposite to that of the first component of wave energy employed in recording the hologram, the hologram will operate on both the object information recorded thereon and the object information contained directly in the readout beam in accordance with the preselected properties of the incident wavefront of the second component of wave energy utilized in recording the hologram.

What is claimed is:

1. A holographic method for obtaining a predetermined array of a given plurality of substantially identical spaced optical real representations of the same given object, comprising the steps of recording on an optical recording medium the holographic interference pattern which results from the simultaneous illumination of said medium by each of a group of mutually coherent components of the same coherent monochromatic light of a given wavelength, said group including a single component of said coherent light that is spatially modulated in accordance with said object and each of a predetermined array of a corresponding plurality of spaced other components of said coherent light equal in number to said given plurality which are arranged in said predetermined array, each respective one of said other components being spatially unmodulated and having a different angular orientation with respect to said single component at said medium, and reading out said recorded holographic interference pattern with a single readout beam which corresponds in angular orientation with respect to said medium to said single component of coherent light that was spatially modulated in accordance with said object.

2. The method defined in claim 1, wherein said readout beam is coherent monochromatic light of said given wavelength, and wherein the angular orientation of said readout beam with respect to said medium is the conjugate of said selected certain single one of said other components.

3. The method defined in claim 1 wherein said readout beam is unmodulated.

* * * * *